L. MAISEL.
CONTACT DEVICE FOR HAND LAMPS.
APPLICATION FILED SEPT. 13, 1913.
1,082,887.
Patented Dec. 30, 1913.
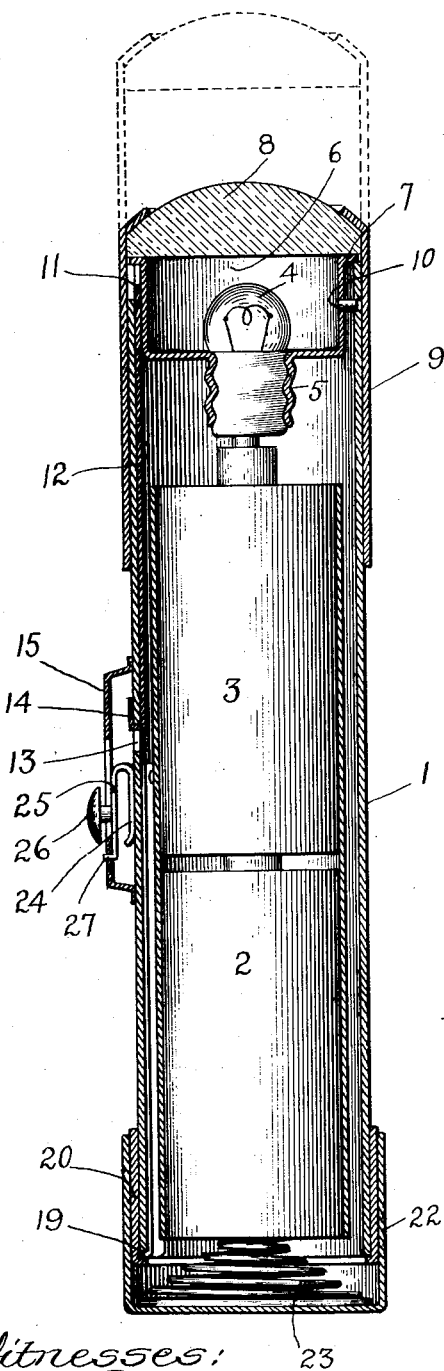
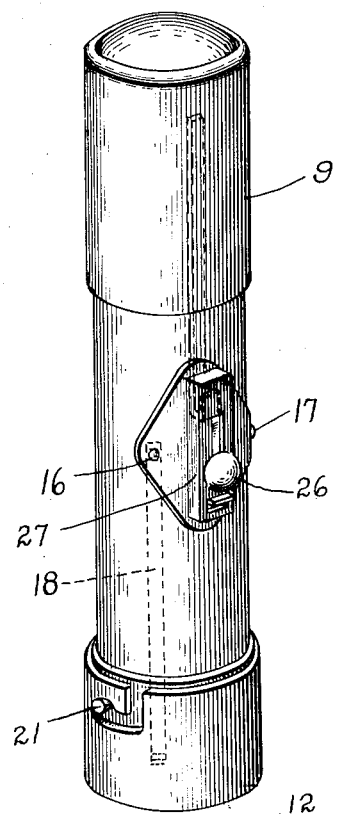
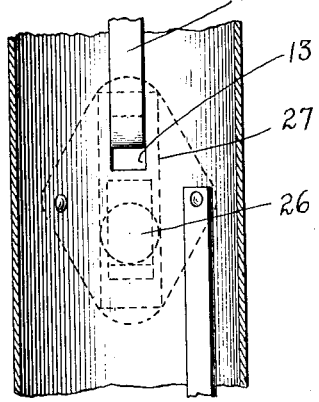
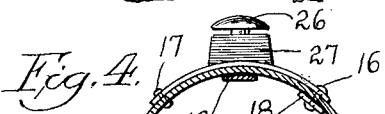
Witnesses:
John Enders
E. B. Schneider
Inventor:
Lorenz Maisel
by Arta B. Marvin
Atty.

UNITED STATES PATENT OFFICE.

LORENZ MAISEL, OF MADISON, WISCONSIN, ASSIGNOR TO NORTHERN CHEMICAL ENGINEERING LABORATORIES, A CORPORATION OF WISCONSIN.

CONTACT DEVICE FOR HAND-LAMPS.

1,082,887.  Specification of Letters Patent.  Patented Dec. 30, 1913.

Application filed September 13, 1913. Serial No. 789,611.

*To all whom it may concern:*

Be it known that I, LORENZ MAISEL, a citizen of the United States, residing at Madison, in the county of Dane and State of Wisconsin, have invented new and useful Improvements in Contact Devices for Hand-Lamps, of which the following is a specification.

The present invention relates to portable lamps of the type in which a battery and incandescent lamp are positioned by a tubular casing which can be carried in the hand, and it is the object of the present invention to provide a contact device easily and conveniently operated when desired, but automatically locked against accidental operation. With battery lamps of the constructions heretofore common, it often happens that when the operator slips the lamp in his coat pocket he will accidentally throw the contact device to send current through the lamp and the lamp may continue to burn for hours without the knowledge of the operator and to no useful purpose. With the contact devices of the present invention this is impossible, for an inward thrust of the thumb piece must be made to unlock the sliding member preliminary to its sliding movement into contacting position.

In the drawings forming a part of this specification, Figure 1 is a section elevation through a complete lamp; Fig. 2 is a perspective view of the same; Fig. 3 is a fragmentary section showing the contact device as it appears from the inside of the tube; and Fig. 4 is a transverse section through the tube just above the contact device.

In the construction illustrated, the hand lamp comprises the fiber casing 1 containing a pair of batteries 2 and 3 connected in series to the terminal of an incandescent lamp 4, the socket terminal of which is in threaded engagement with the extension 5 of a cylindrical reflector 6, positioned in the end of casing 1 and having a flanged rim 7 seated against the end of that casing. A lens 8 carried in a metal tube 9 slidingly mounted on the fiber casing 1, but insulated from the reflector and the lamp, may be used to shift the focus of the beam of light coming from the lamp by shifting the distance between the lens and the lamp.

Reflector 6 may be held in position by a pin or rivet 10 and preferably has a soldered connection at 11 with a metal strip 12 which extends along the inner surface of the fiber casing to a small opening or slot 13, and there is bent through and folded down over the outer face of tube 1 to form a contact lug 14. Enveloping lug 14 and opening 13 is a housing 15 preferably pressed up from sheet brass and provided with a base shaped to the cylindrical contour of the fiber tube and having ears through which rivets 16 and 17 may be passed to secure the housing to the fiber tube. Rivet 16 also passes through a metal strip 18 positioned within the fiber tube and extending to the end of that tube remote from the lamp, where its end may be bent to form a lug 19, establishing electrical connection with the flanged edge of a collar 20, which reinforces that end of the fiber tube and carries pins 21, making a bayonet joint connection with a cup-shaped closure 22, wherein a coil spring 23 is seated for contacting with the zinc electrode of one of the batteries.

Within housing 15 is a sliding contact member consisting of a U-shaped strip of resilient metal such as brass. The inner leg 24 of this strip slides along the outer face of the fiber tube into and out of contact with lug 14, being rounded at its front and trailing portions to make its movement more easy. The outer leg 25 of the strip carries a pin which projects through a slot in housing 15 and is surmounted by a thumb piece or button 26. Also this leg is bent outward at its end to form a locking lug 27 which may project through a short slot in the housing, thereby locking the sliding member against movement until after the thumb piece 26 has been pushed inward far enough to withdraw lug 27 from its slot. The resilient member may be made relatively stiff and, owing to the locking engagement of its lug 27, is not exposed to accidental displacement when the lamp is slipped into the pocket of the operator. But when the lamp is to be lighted the necessary forward and inward pressure is one which naturally is given to the thumb piece by the thumb of the operator, thus automatically unlocking the sliding member just prior to its advancement into contact position. Lug 27 in advancing along the inner face of the housing 15 overlaps the slot therein and gives a sliding connection therewith, and the connection between lug 24 and lug 14 is a sliding or wiping connection, so that all of the parts tend to keep bright and afford contacts of low resistance. The opening 13 affords a gap across which no conductive bridges can be built due to progressive wear of the parts and, consequently, there can be no slow leakage of current from the batteries through the contact device.

With the construction here disclosed, all of the conductive members at the lamp end of the casing are housed within the casing and are so inclosed that accidental contact therewith is not possible. The only part projecting through the fiber casing is a lug 14, and this is within the housing and not subject to accidental contact. The result is that the lamp may be placed in a tool box or in contact with metal objects without the danger of bridging the gap of the contact device and closing the circuit through the lamp.

I claim:

1. In a battery hand lamp, the combination of a casing, batteries and a lamp therein, a housing secured to said casing and permanently connected with said batteries, a conductor connected with said lamp and terminating within said housing, and a sliding contact member positioned within said housing and movable into and out of contact with that part of said conductor which is within said housing.

2. In a tubular hand lamp, the combination of an insulating casing, batteries and a lamp therein, and a contact device for establishing connection between said batteries and said lamp, said contact device comprising a housing secured to said casing, and a sliding member positioned within said housing and having a projection locking it against movement except after an inward thrust thereon.

3. In a battery hand lamp, comprising a casing, batteries and a lamp therein, conductors leading respectively from said batteries and said lamp, and a contact device for connecting said conductors, said device comprising a housing permanently connected to one of said conductors, and a resilient member positioned within said housing and movable with a sliding motion along said housing into contact with the other conductor, said resilient member initially having locking engagement with the housing and means for pushing said resilient member inward out of locking engagement with said housing, preparatory to its advancement into contacting position.

4. In a battery hand lamp, the combination of a tubular fiber casing, batteries and a lamp therein, a slot in said casing, a conductor leading from said lamp through said slot and terminating in a contact lug, a housing inclosing said lug to shield it against accidental contact, a connection between said housing and said batteries, and a resilient member mounted within said housing and movable with a sliding motion along said housing and across said slot into contact with said lug, a thumb piece for said resilient member, and means for locking said member initially against sliding movement until said thumb piece is pressed inward toward the casing.

5. In a tubular hand lamp, the combination of a casing, batteries and a lamp therein, an opening in said casing, a conductor leading from said lamp through said opening and terminating in a contact lug, a housing secured to said casing and enveloping said lug, a permanent connection between said housing and said batteries, said housing having a longitudinal slot, a U-shaped resilient member within said housing and slidingly mounted to move across the opening in said casing into and out of contact with said lug, said resilient member carrying a thumb piece projected through the slot in said housing, and also carrying a lug adapted by engagement with a slot in said housing to serve as a stop initially preventing the sliding movement until the thumb piece has been pushed inward far enough to disengage said lug from its slot, thereby protecting the lamp against accidental lighting.

In testimony whereof I affix my signature, in presence of two witnesses.

LORENZ MAISEL.

Witnesses:
CHARLES F. BURGESS,
W. B. SCHULTE.